US008231008B2

(12) United States Patent
Patterson et al.

(10) Patent No.: US 8,231,008 B2
(45) Date of Patent: Jul. 31, 2012

(54) COLUMN FLOTATION CELL FOR ENHANCED RECOVERY OF MINERALS SUCH AS PHOSPHATES BY FROTH FLOTATION

(75) Inventors: Stanley A. Patterson, Lithia, FL (US); David R. Spedden, Fort Meade, FL (US); Anthony F. Harding, Valrico, FL (US); David Kennedy, Lakeland, FL (US)

(73) Assignee: MOS Holdings Inc., Plymouth, MN (US)

( * ) Notice: Subject to any disclaimer, the term of this patent is extended or adjusted under 35 U.S.C. 154(b) by 841 days.

(21) Appl. No.: 12/370,286

(22) Filed: Feb. 12, 2009

(65) Prior Publication Data

US 2009/0145821 A1    Jun. 11, 2009

Related U.S. Application Data

(62) Division of application No. 11/099,940, filed on Apr. 6, 2005, now Pat. No. 7,510,083.

(60) Provisional application No. 60/582,862, filed on Jun. 28, 2004, provisional application No. 60/583,606, filed on Jun. 30, 2004.

(51) Int. Cl.
B03D 1/14 (2006.01)
B01D 1/24 (2006.01)
(52) U.S. Cl. ........................................ 209/168; 209/170
(58) Field of Classification Search .................. 209/168, 209/170
See application file for complete search history.

(56) References Cited

U.S. PATENT DOCUMENTS

| 1,279,040 A | 9/1918 | Thomas |
| 1,380,665 A | 6/1921 | Lyster |
| 2,931,502 A | 4/1960 | Schoeld et al. |
| 3,428,175 A | 2/1969 | Hukki |

(Continued)

FOREIGN PATENT DOCUMENTS

DE    4429277 A1    2/1996

(Continued)

Primary Examiner — Thomas M Lithgow
(74) Attorney, Agent, or Firm — Patterson Thuente Christensen Pedersen, P.A.

(57) ABSTRACT

An apparatus for separating a mineral from a slurry of mineral and impurities, including a fluid vessel having a first, open end and a second end and a feed well disposed near the first end. The feed well has a first, open end, for receiving the slurry, and a second end. At least one first member is received through the first ends of the vessel and the feed well for providing aerated water, creating a froth in the feed well including substantially the mineral. The mineral froth substantially separates from the impurities and floats out of the feed well towards the first end of the vessel, and a collection unit receives the mineral froth. The impurities and any remaining mineral fall toward the second end of the vessel. A measurement unit is placed within the vessel for measuring at least one of density and pressure of the fluid in the vessel. A related process includes introducing the slurry into the first, open end of the feed well, providing aerated water to the feed well and the vessel in a direction from the first ends to the second ends, respectively, creating a froth in the feed well including substantially the mineral, substantially separating the mineral froth from the impurities, collecting the mineral froth, and allowing the impurities and any un-separated mineral to fall towards the second end of the vessel. Further, the process includes measuring at least one of density and pressure of the fluid in the vessel.

26 Claims, 9 Drawing Sheets

U.S. PATENT DOCUMENTS

| | | |
|---|---|---|
| 3,862,028 A | 1/1975 | Jones et al. |
| 4,158,623 A | 6/1979 | Wang et al. |
| 4,206,045 A | 6/1980 | Wang et al. |
| 4,207,178 A | 6/1980 | Wang et al. |
| 4,287,054 A | 9/1981 | Hollingsworth |
| 4,309,282 A | 1/1982 | Smith, Jr. et al. |
| 4,394,258 A | 7/1983 | Zipperian |
| 4,431,531 A | 2/1984 | Hollingsworth |
| 4,436,617 A | 3/1984 | Moore et al. |
| 4,450,072 A | 5/1984 | Suplicki |
| 4,532,033 A | 7/1985 | Anthes et al. |
| 4,552,651 A | 11/1985 | Sandbrook et al. |
| 4,617,113 A | 10/1986 | Christophersen et al. |
| 4,639,313 A | 1/1987 | Zipperian |
| 4,642,181 A | 2/1987 | Polinsky et al. |
| 4,725,358 A | 2/1988 | Ananthapadmanabhan et al. |
| 4,735,709 A | 4/1988 | Zipperian |
| 4,737,272 A | 4/1988 | Szatkowski et al. |
| 4,830,738 A | 5/1989 | White et al. |
| 4,867,867 A | 9/1989 | Lilley |
| 4,883,586 A | 11/1989 | Bierman et al. |
| 4,904,375 A | 2/1990 | Snow |
| 4,964,576 A | 10/1990 | Datta |
| 4,966,687 A | 10/1990 | Trigg |
| 4,971,731 A | 11/1990 | Zipperian |
| 5,078,921 A | 1/1992 | Zipperian |
| 5,122,261 A | 6/1992 | Hollingsworth |
| 5,173,176 A | 12/1992 | Klimpel et al. |
| 5,192,423 A | 3/1993 | Duczmal et al. |
| 5,205,926 A | 4/1993 | Lawrence |
| 5,221,466 A | 6/1993 | Garcia et al. |
| 5,234,112 A | 8/1993 | Valenzuela et al. |
| 5,249,688 A | 10/1993 | Hwang |
| 5,266,240 A | 11/1993 | Valenzuela et al. |
| 5,275,732 A | 1/1994 | Wang et al. |
| 5,307,937 A | 5/1994 | Hutwelker |
| 5,311,997 A | 5/1994 | Gantt et al. |
| 5,332,100 A | 7/1994 | Jameson |
| 5,358,120 A | 10/1994 | Gantt et al. |
| 5,467,876 A | 11/1995 | Hicks et al. |
| 5,551,574 A | 9/1996 | Hicks et al. |
| 5,687,609 A | 11/1997 | Schmalzel |
| 5,702,612 A | 12/1997 | Wang |
| 5,965,857 A | 10/1999 | Hughes |
| 6,017,020 A | 1/2000 | Baughman et al. |
| 6,056,125 A | 5/2000 | Lai et al. |
| 6,092,667 A * | 7/2000 | Steinmuller et al. .......... 209/164 |
| 6,178,383 B1 | 1/2001 | Pegram et al. |
| 6,409,022 B1 | 6/2002 | Rothenberg et al. |
| 6,636,812 B2 | 10/2003 | Pegram et al. |
| 7,510,083 B2 | 3/2009 | Patterson et al. |

FOREIGN PATENT DOCUMENTS

| | | |
|---|---|---|
| WO | WO 85/00021 | 1/1985 |
| WO | WO 93/25313 | 12/1993 |
| WO | WO 97/17123 | 5/1997 |

* cited by examiner

US 8,231,008 B2

COLUMN FLOTATION CELL FOR ENHANCED RECOVERY OF MINERALS SUCH AS PHOSPHATES BY FROTH FLOTATION

RELATED APPLICATION

This application is a division of application Ser. No. 11/099,940 filed Apr. 6, 2005, which claims the benefit of U.S. Provisional Application No. 60/582,862 filed Jun. 28, 2004 and U.S. Provisional Application No. 60/583,606 filed Jun. 30, 2004, each of which is hereby fully incorporated herein by reference.

BACKGROUND OF THE INVENTION

1. Field of the Invention

The present invention is directed to the recovery of minerals such as phosphate and, more particularly, to a column flotation cell and related method to enhance phosphate recovery.

2. Description of Related Art

Presently, phosphate is recovered from a sand-clay mixture that is mined from mineral deposits. Traditionally, phosphate is mixed with a collector, suspended in water and urged to the surface of an aeration tank called a flotation cell.

For example, as shown in FIG. 1 herein, U.S. Pat. No. 4,735,709 describes a flotation system 10 with means for introducing a gaseous medium such as air, to facilitate flotation. The system 10 generally includes a flotation vessel 12, and two air sparger systems 14 and 16 for introducing a gaseous medium or air into the vessel 12.

The vessel 12 is formed as an upright elongated cylinder having a vertical wall 18 and a bottom wall 20. The vessel 12 is typically open at an upper end 22. A substantially horizontally-disposed constriction plate 24 is located within the vessel 12, spaced above the bottom wall 20, to separate the vessel 12 into a flotation compartment 26 above the constriction plate 24 and a distribution compartment 28 below the constriction plate 24. The constriction plate 24 has a plurality of orifices 30 to permit passage of aerated water from the distribution compartment 28 to the flotation compartment 26.

A feed well 32 is supported within the upper end 22 of the flotation compartment 26 by a base 33. A feed tube 34 from an external source of aqueous slurry (not shown) delivers a controlled quantity of the aqueous slurry to the feed well 32. The feed well 32 has an overflow baffle 36 to distribute the aqueous slurry throughout the flotation compartment 26. The feed well of this conventional design is located under the water level 11 in the vessel 12.

Air bubbles are introduced into the bottom of the fluid vessel 12 by flowing aerated water through the air sparger 14 and into a manifold 38 exiting into the vessel 12 via the orifices 30. The air bubbles aerate the slurry in the vessel 12.

The slurry entering vessel 12 contains phosphate, impurities and a collector. The use and types of collectors are well known in the art. An example of a typical collector used in the art is a hydrocarbon such as tall oil. See, e.g., U.S. Pat. No. 6,178,383. The phosphate suspended in the aqueous slurry adheres to the rising air bubbles and collects at the upper end of the flotation compartment 26 as a froth.

A launder 44 is provided at the upper end 22 of the vessel 12, atop the cylinder wall 18. The launder 44 generally includes a circular inner wall 45, a relatively higher outer wall 47 and a bottom wall 49 that form a trough 51 to receive the froth, which overflows from the flotation compartment 26. The froth overflows into the trough 51 when the froth inside the flotation compartment 26 rises and spills over the top of the lower circular inner wall 45. An outlet 46 is provided in the outer wall 47, near the bottom wall 49, to convey the overflowing phosphate-laden froth from the launder 44 to further processing or storage.

The impurities including sand and clay contained within the slurry along with any residual phosphate that is not captured by the levitating air bubbles percolates downwardly through the aqueous slurry by gravity. An opening 48 is formed through the center of the constriction plate 24 into which the impurities pass through. An outlet 50 extends from the opening 48 through the bottom wall 20 of the cylinder 12. The outlet 50 allows removal of the impurities from the vessel 12.

The orifices 30 can "choke" over a period of time because the velocity of the air bubbles moving through the orifices 30 is not high enough to prevent the downwardly percolating impurities including sand from plugging the orifices 30. The result of the choking is that aerated water will not be able to enter and circulate through the vessel 12, which results in poor separation of the phosphate from the impurities.

Further, the system 10 generally exists an as alkaline environment, which can allow algae growth. Algae growth is promoted near the orifices 30 because the levitating air bubbles create low-turbulence areas near the orifices 30. Algae will attach and grow at these low-turbulence areas such that over time the orifices 30 will get sealed off, preventing the even dispersion of aerated water throughout the vessel 12.

U.S. Pat. No. 4,735,709 also describes the use of a separate air sparger system 16 that discharges aerated water above the constriction plate 24 into the vessel 12 via orifices 41 in pipes 40. However, these orifices 41 can also choke over a period of time as the impurities from the slurry percolate downward in the vessel 12 for the same reasons as described above.

The choking of the orifices 30 and 41 can not only prevent the even aeration of the vessel 12, but also require maintenance involving the cleaning or redrilling of the orifices 30 and 41 in order to un-choke or un-plug them. The phosphate separation process, therefore, has to be suspended for maintenance and cannot be carried on as a continuous process. A continual need for maintenance introduces down time and maintenance costs into the separation process, which results in reduced recovery of phosphate and high cost of operation.

As also known in the art, the above-described column flotation cell can require significant capital expenditures to build, depending upon the size, component parts, etc. The system is also known to require a significant amount of energy to thrust aerated water from the bottom to the top of the column flotation cell.

Thus, although the prior art described above has generally been widely used for the purposes of recovering minerals such as phosphate from impurities, it still does not disclose or teach a column flotation cell and a method of use that reduces capital costs, lowers energy consumption, prevents substantial choking of the column and allows easier maintenance.

SUMMARY OF THE INVENTION

Accordingly, it is an aspect of the present invention to provide an apparatus and process for separating minerals such as phosphate from impurities using a column flotation cell that substantially eliminates choking.

It is another aspect of the present invention to provide an apparatus and process for recovering phosphate using a column flotation cell that is easier to maintain.

It is another aspect of the present invention to provide an apparatus and process for recovering phosphate using a column flotation cell that utilizes a cell density control process wherein the density within the column is monitored to regulate the discharge of impurities from the bottom of the column influenced by the amount of incoming slurry.

It is also an aspect of the present invention to provide an apparatus and process for recovering phosphate using a column flotation cell receiving aerated water via down pipes to substantially eliminate choking and improve dispersion of air into the cell.

It is a further aspect of the present invention to provide an apparatus and process for enhanced recovery of phosphate that uses less energy per yield.

Finally, it is an aspect of the present invention to provide an apparatus for recovering phosphate having a substantially compact design to reduce capital cost for installation and maintenance.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Various embodiments of the present invention will now be described with reference to the drawings. In this description, certain dimensions are used to assist in understanding the structure of the invention. Of course, one of ordinary skill in the art may vary the dimensions without departing from the invention. As a result, it is not intended that the invention be limited by any particular dimensions.

Figure 2:
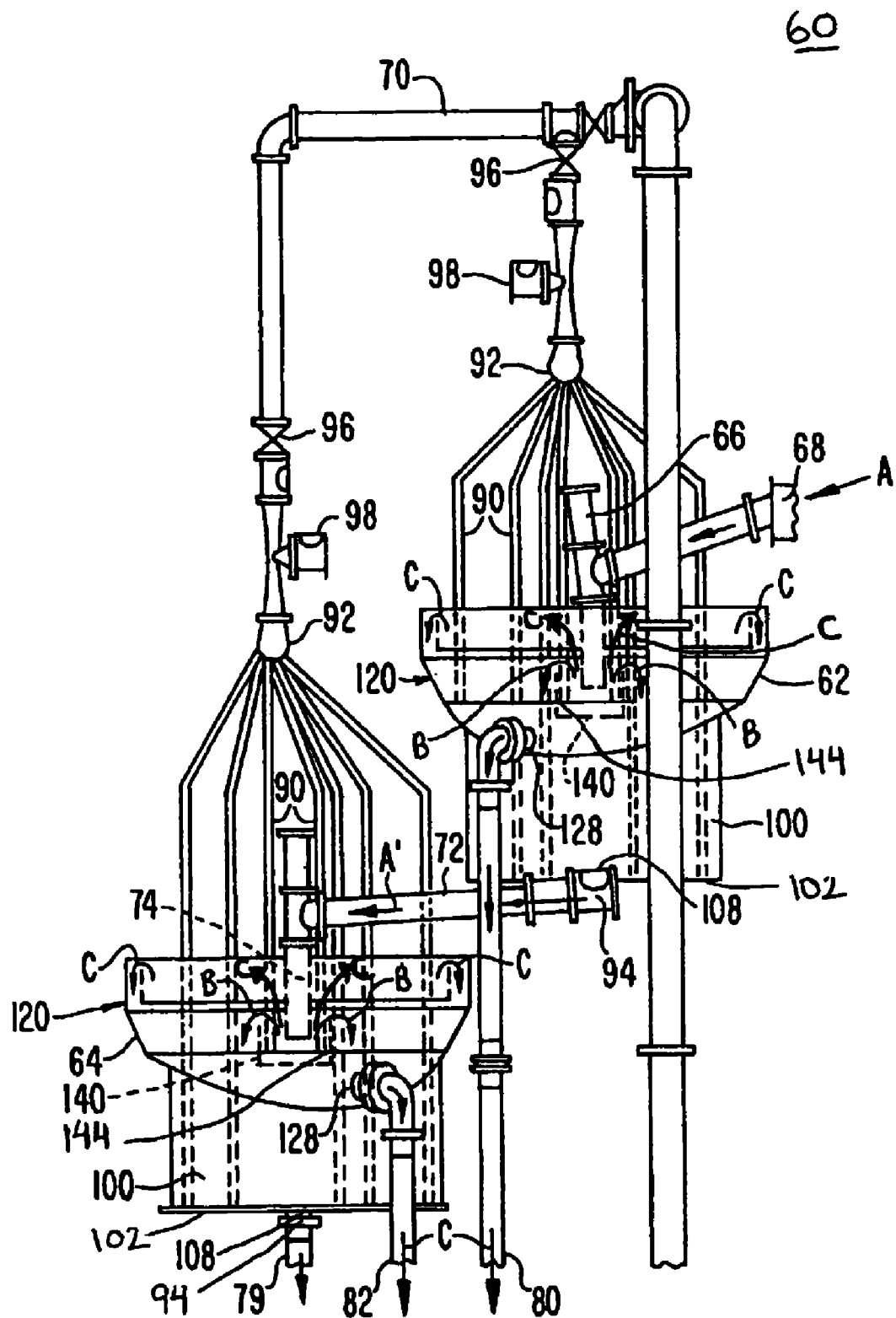
FIG. 2 is a schematic view of a separation system according to an embodiment of the present invention, including a pair of interconnected column floatation cells.

FIG. 2 is a schematic view of a separation system 60 according to an embodiment of the present invention. The system 60 includes generally a pair of interconnected column floatation cells, i.e., a primary cell 62 and a secondary cell 64, each having similar constructions, as described below.

The two cells 62 and 64 are placed at different heights and are interconnected for a staged separation of a feed slurry having phosphate, impurities such as sand and clay, and one or more known collectors such as tall oil. The incoming feed slurry is referred to herein as "A".

Although in this embodiment two cells are described and shown, other numbers of cells, including one, may be used. Use of multiple staged cells achieves a higher phosphate recovery from A.

Into the primary cell 62 there extends a feed tube 66 extending from a conventional slurry source 68. An outlet 108 is formed at a bottom 102, described below, of the primary cell 62 and is connected to a pipe 72, which leads to another feed tube 74.

A water line 70 having a pair of eductors 92 supplies aerated water and one or more known frothers such as polyglycol into the cells 62 and 64, respectively. Eductors 92 are aspirators that introduce air into the water coming through the water line 70. Valves 96 control the amount of water passing to the eductors 92. Air is introduced into the water entering the eductors 92 via valves 98 to generate aerated water. Therefore, both the amount of water and air passing through the eductors 92 are adjustable.

Down pipes 90 are connected to the eductors 92 and thrust the aerated water into the primary and secondary cells 62 and 64. The down pipes 90 are preferably clamped to a baffle 160 located near the top of each cell, as described below, and terminate near the bottom 102 of both cells 62 and 64 (see FIG. 6). Down pipes 90 are also preferably clamped to sides 144 of feed wells 140 in each of the cells 62 and 64. The down pipes 90 terminate near the bottom 142 of the feed wells 140 within both cells 62 and 64 (see FIG. 8).

The feed slurry A entering cell 62 via feed tube 66 pours into the feed well 140, where the separation process begins. Phosphate froth is generated due to the air bubbles rising in the feed well 140 as described below. In the first step of separation, the feed well 140 separates much of the impurities contained in A from the phosphate to create phosphate froth substantially free from impurities. This phosphate froth is referred to herein as "C" and the separated impurities are referred to herein as "B".

Figure 6:
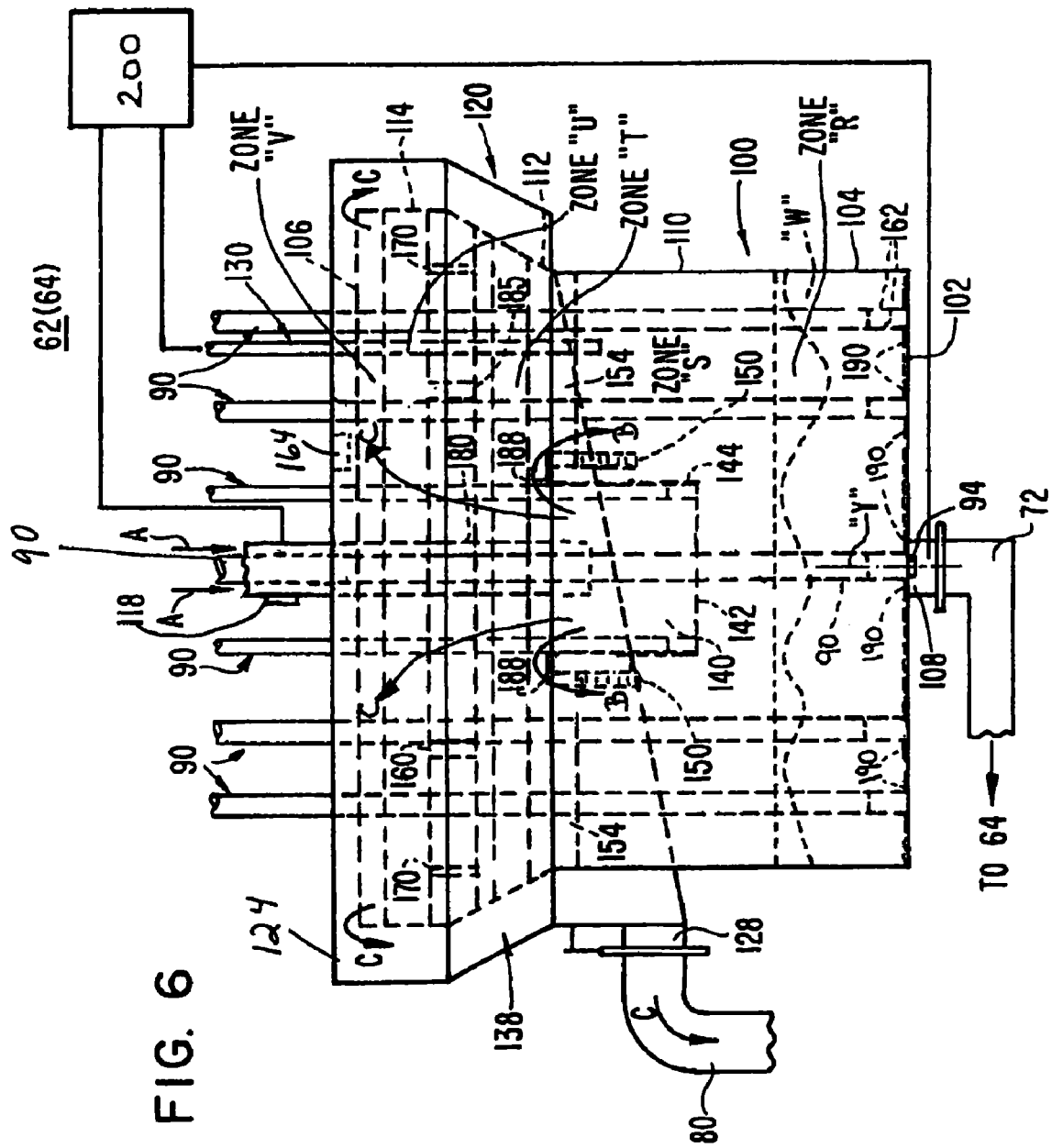
FIG. 6 is a side, elevational view of one column flotation cell according to an embodiment of the present invention.
Figure 8:
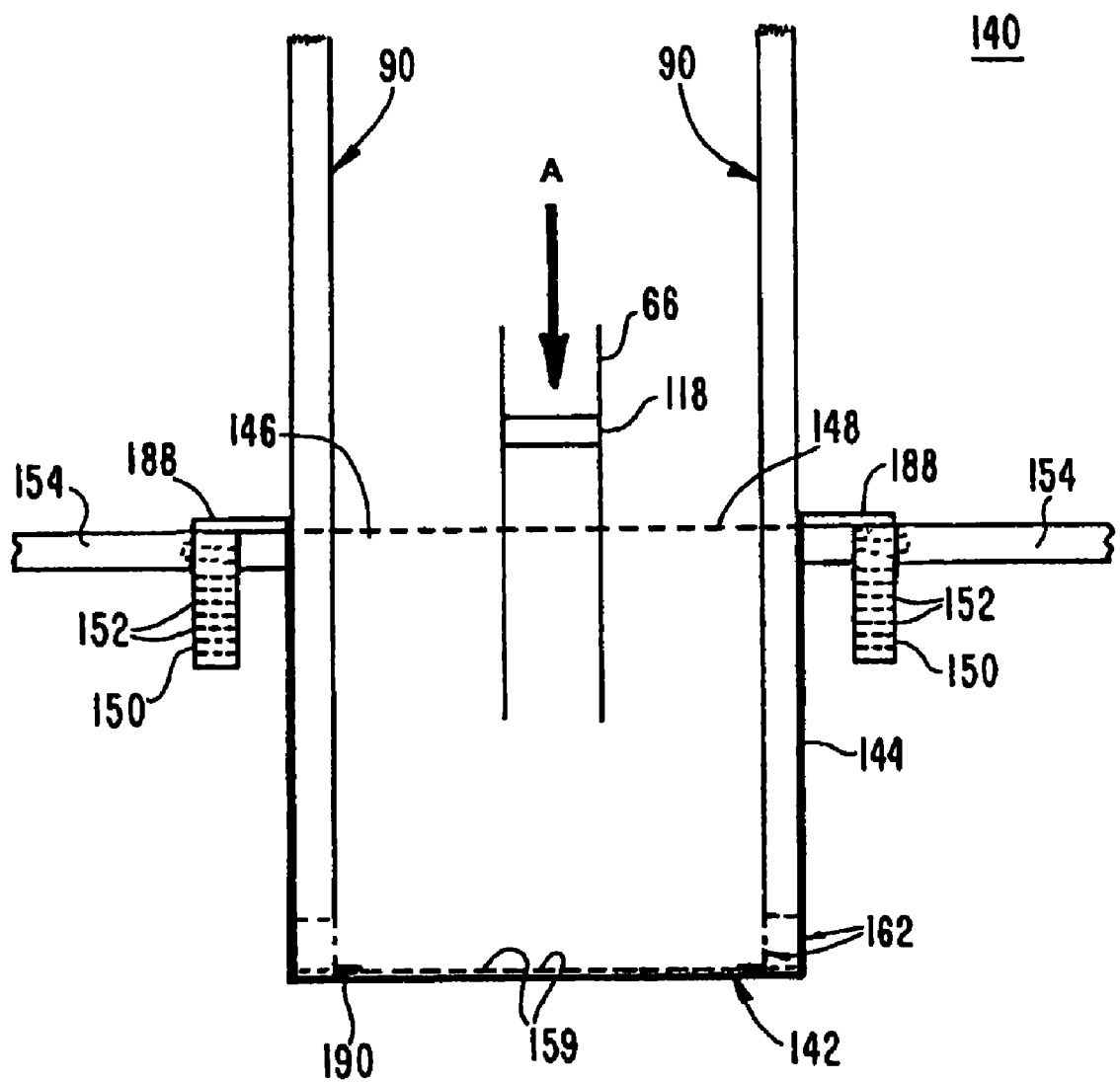
FIG. 8 is a side cross-sectional view of a feed well according to an embodiment of the present invention.

C is thrust upward out of the feed well 140 and into a column 100 of cell 62 as the phosphate froth rises towards a top 146 of the feed well 140 continuing to a top 106 of the column 100 (see FIGS. 6 and 8). The rise of the phosphate froth C is promoted by the thrust of the rising air bubbles and the hydrophobicity of the collector in the phosphate froth C. The hydrophobicity of the phosphate froth C renders it amenable to flotation by attachment to the rising air bubbles. The impurities B along with any un-separated phosphate fall toward the bottom 102 of the column 100. The separation process is completed in the column 100 where rising air bubbles from the bottom 102 of the column 100 generate an upward thrust of air, referred to herein as "air hold-up". C then spills out of the top 106 of the column 100 into the launder 120 as the top 106 of the column 100 is lower than a top 124 of the launder 120. (See discussion below regarding FIG. 6).

The launder 120 of the primary, upper cell 62 has an outlet 128, which draws off the separated phosphate froth C and sends it via an outflow pipe 80 for further processing or storage, as in the prior art described above.

The impurities B and the remaining un-separated phosphates at the bottom 102 of the column 100, exit cell 62 via the outlet 108. A pinch valve 94 controls movement of the impurities B and the remaining un-separated phosphates through the outlet 108. The column 100 of the secondary, lower cell 64 also has an outlet 108 controlled by a pinch valve 94. The feed tube 74 introduces the impurities B and the remaining un-separated phosphates, herein referred to as A', into the feed well 140 of the secondary cell 64 for staged separation. Therefore, A' collected from cell 62 is separated again in cell 64 allowing for improved recovery of phosphate.

The outlet 128 of the lower, secondary cell 64 allows removal of the separated phosphate froth C via an outflow pipe 82 in a manner similar to that described above for further processing or storage. The outlet 108 on the secondary cell 64 allows the impurities B such as sand and clay particles that accumulate along with any unrecovered phosphate near the bottom 102 of the column 100 to be drawn off via a pipe 79. These impurities B and any unrecovered phosphate can either be disposed of or directed to another staged cell for further processing in order to recover additional phosphate.

Figure 3:
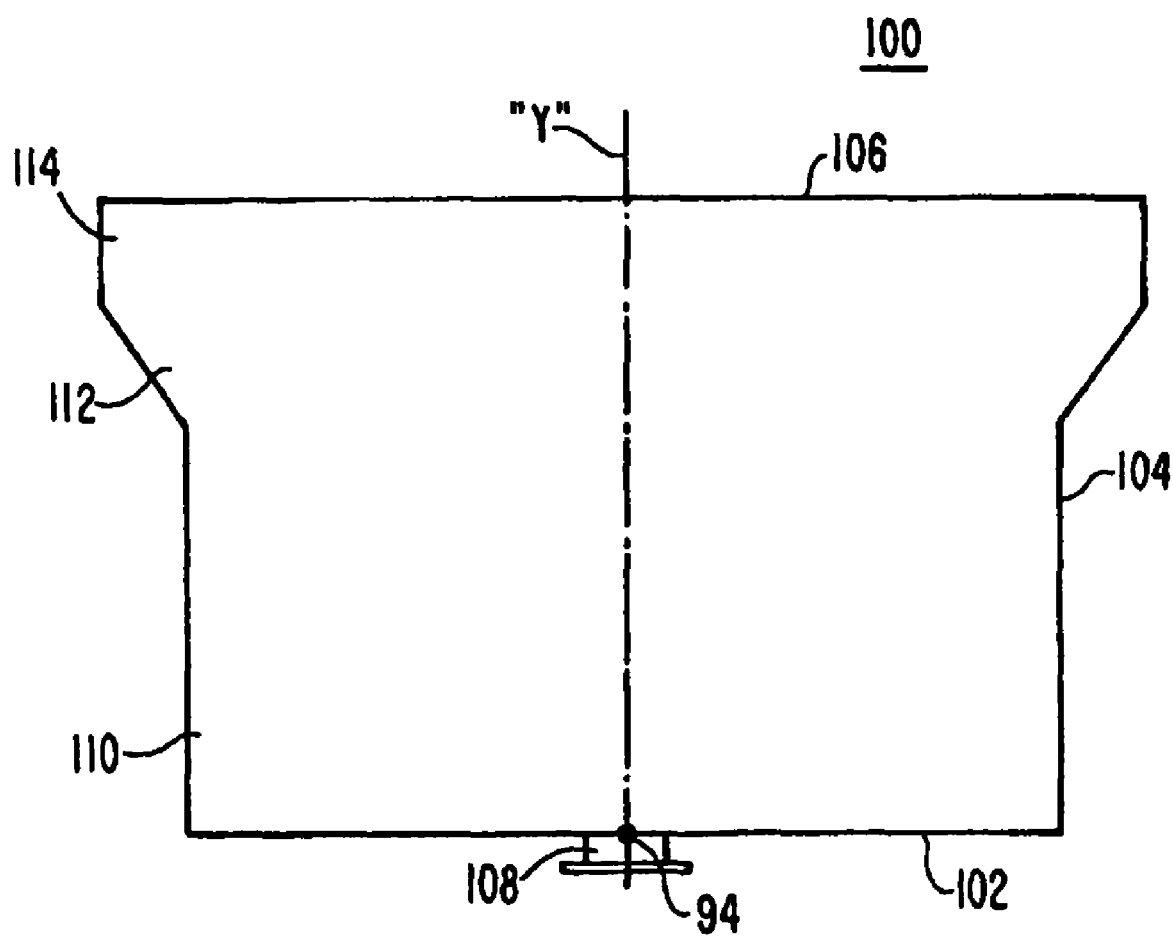
FIG. 3 is a side, elevational view of a column used with the column flotation cell of the present invention.

FIG. 3 illustrates in greater detail the column 100 of the column flotation cells 62 and 64. A central axis is shown by "Y". The column 100 includes the solid bottom 102 and a substantially columnar sidewall 104, which is open at the top 106. The diameter of the sidewall 104 increases from the bottom 102 to the top 106 of the column 100. Due to the differences in diameter, there are formed a lower columnar portion 110, a middle beveled portion 112, and an upper columnar portion 114. The bottom 102 includes the outlet 108, which allows the removal of A' from the bottom 102 of the column 100 in cell 62.

In a preferred embodiment of the present invention, the height of the column 100 is about 6 feet. The external diameter at the top 106 of the column 100 is preferably about 10 feet. Both the external diameter towards the top of the column and the height of the column 100 may be in the range of about 3-40 feet. The ratio of the external diameter of the top 106 of the column 100 to the height of the column 100 is in the range of about 0.5-2.0. More preferably the ratio is in the range of about 0.6-1.33. Therefore, unlike conventional columns that have a height that is much greater than the width, the present invention can use the reverse configuration, i.e., a height that is less than the diameter of the column. This configuration allows the system 60 of the present invention to be more compact, requiring less energy to thrust water from the bottom 102 of the column 100 via down pipes 90.

Figure 4:
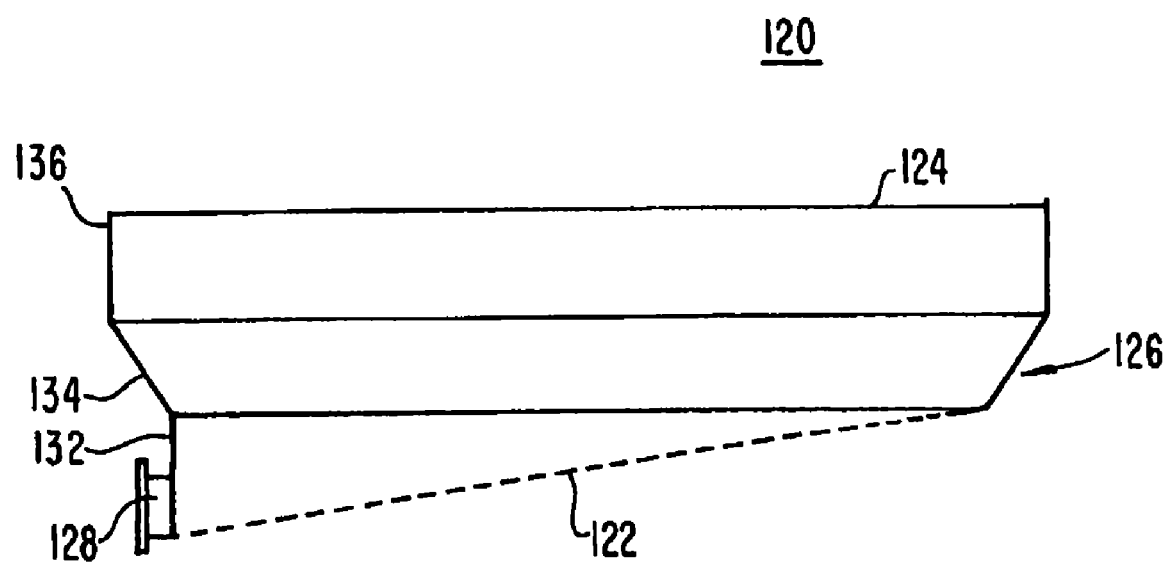
FIG. 4 is a left side, elevational view of a launder used with the column flotation cell of the present invention.
Figure 5:
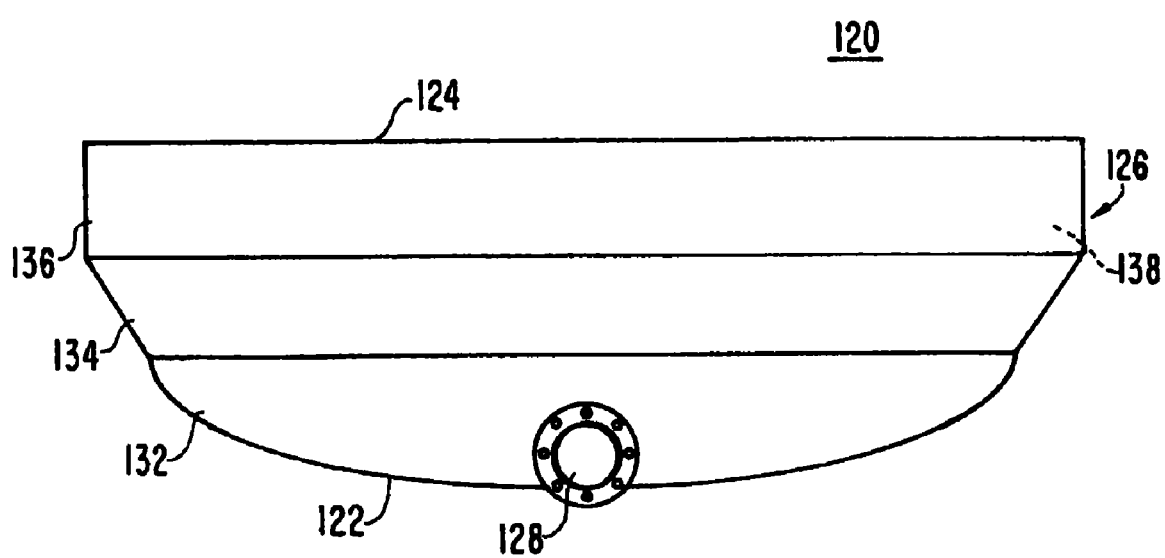
FIG. 5 is a front, elevational view of the launder shown in FIG. 4.

FIG. 4 is a left side elevational view, and FIG. 5 is a front elevational view, of the launder 120 used with the cells 62 and 64. The launder 120, like the column 100, is generally cylindrical, having a bottom 122, a top 124 and a sidewall 126. The bottom 122 is angled relative to the top 124.

The diameter of the sidewall 126 increases from the bottom 122 to the top 124 of the launder 120. Due to this difference in diameter, there is formed a lower angled portion 132, a middle beveled portion 134, and an upper columnar portion 136. A trough 138 (FIGS. 6 and 7) is formed between the upper portions of the column 100 and launder 120 for collecting the phosphate froth C. The lower angled portion 132 is angled (side view FIG. 4) and curved (FIG. 5) toward the outlet 128 to allow the collected phosphate froth C to run therealong via gravity, as in the prior art launder 44 described above. The pipe 128 extends from the sidewall 126 near the bottom 122 of the launder 120 to allow removal of the phosphate froth C from the launder.

FIG. 6 shows the primary cell 62, which is exemplary of the structure of the cell 64, as noted above. The cell 62 generally includes the column 100, the launder 120, the feed well 140, plates 150, support pipes 154, and baffles 160, 170, and 188. Each of these components will now be described in greater detail.

The column 100 receives the launder 120 towards the top 106 of the column 100 and is preferably welded to the launder 120. The top 106 of the column 100 is lower than the top 124 of the launder 120 (see FIGS. 2 and 6). Due to this difference in height, the phosphate froth C can run over the top 106 of the sidewall 104 of the column 100 and into the launder 120, i.e., into the trough 138 formed between the column 100 and the launder 120, where the phosphate froth C moves by gravity to the bottom 122 of the launder 120, to be removed via the outlet 128.

The angling of the launder bottom 122 (see FIG. 4) aids in the movement of the phosphate froth C by gravity. That is, the phosphate froth is relatively tacky due to its hydrophobicity, which causes water to be "shed" from the phosphate froth frustrating any natural flow of the material. The sloped bottom of the launder 120 substantially eliminates this problem and allows for the collection of the phosphate froth near the pipe 128.

The feed well 140 receives the incoming slurry A via feed tube 66. The rate of the incoming slurry is controlled by a regulating device 118 such as a variable speed pump, a conveyor belt or a pinch valve. The feed well 140 of the present invention discharges over the top 146. In addition, the feed well 140 of the present invention is at an adjustable height below the operating water line 148. (See FIG. 8).

The feed well 140, having a bottom wall 142, a sidewall 144, and an open top 146 is disposed towards the center of the column 100. The feed well 140 is secured by using four equally radially-spaced plates 150 thereon with holes to allow bolts 152 to attach to the support pipes 154. The plates 150 allow the placement of the feed well 140 at an adjustable height within the column 100 with respect to the support pipes 154.

Down pipes 90 are introduced into the column 100 and the feed well 140 for the purpose of introducing aerated water into the cells 62 and 64 and the feed well 140. (See FIGS. 2, 6 and 8). These down pipes 90 enter the column 100 and the feed well 140 from the top and extend about 2-3 pipe diameters or approximately 3 inches from the bottom 102 of the column 100 and the bottom 142 of the feed well 140, respectively.

According to a preferred embodiment of the present invention, five down pipes 90 are introduced directly into the column 100. The down pipes 90 are fixedly attached by clamping (not shown) to the baffles 160 of the column 100. Extension rods 162 extend from the bottom of the down pipes 90 attaching to horizontally disposed metal discs 190 that rest on top of a wear plate 158. The wear plate 158 rests on the bottom 102 of the column 100.

Down pipes 90, e.g., two, can also be introduced directly into the feed well 140. These down pipes 90 are clamped (not shown) to the sides 144 of the feed well 140 and rest on a wear plate 159 at the bottom 142 of the feed well 140, in a similar manner as described above. See FIG. 8.

The wear plates 158 and 159 at the bottom 102 of the column 100 and at the bottom 142 of the feed well 140, respectively, protect the bottoms 102 and 142 from excessive wear. For example, without the plate 158, the bottom 102 of the column 100 would have to be replaced or consistently maintained due to excessive abrasion caused by large quantities of sand and other abrasive impurities from the slurry moving across the bottom 102 of the column 100.

The wear plates 158 and 159 may be made of any material such as reinforced steel. Cladded wear plates may also be used as they provide the abrasion resistance that approaches ceramics. The wear plates 158 and 159, therefore, serve the function of both support (of the down pipes 90) and protection of the bottoms 102 and 142.

It is preferred that the down pipes 90 be fixedly attached, e.g., clamped, to the baffles 160 in the column 100 in order to ensure even dispersion of the incoming aerated water throughout the entire column 100 and the feed well 140 via the down pipes 90, by substantially reducing any movement of the down pipes 90 due to turbulence.

The down pipes 90 are also spaced such that maximum distribution of aerated water is allowed in the feed well 140 and the column 100. Generally, maximum distribution of aerated water may be achieved by the equidistant spatial placement of all down pipes 90 in the column 100 and the feed well 140.

The feed well baffle 188 aids in the separation of impurities such as sand from the phosphate which spills out of the feed well 140 into the column 100. The feed well baffle 188 is attached to the feed well 140 such that as the impurities B spill out of the feed well 140, B moves across the feed well baffle 188 before spilling into the column 100. The feed well baffle 188 redirects the flow and constricts the flow area reducing turbulence in column 100. This constricting enhances coalescence of the un-separated phosphate in B and acts to separate any suspended impurities flowing with the rising air bubbles. The separated impurities fall downwardly and settle at the bottom 102 of the column 100.

Figure 7:
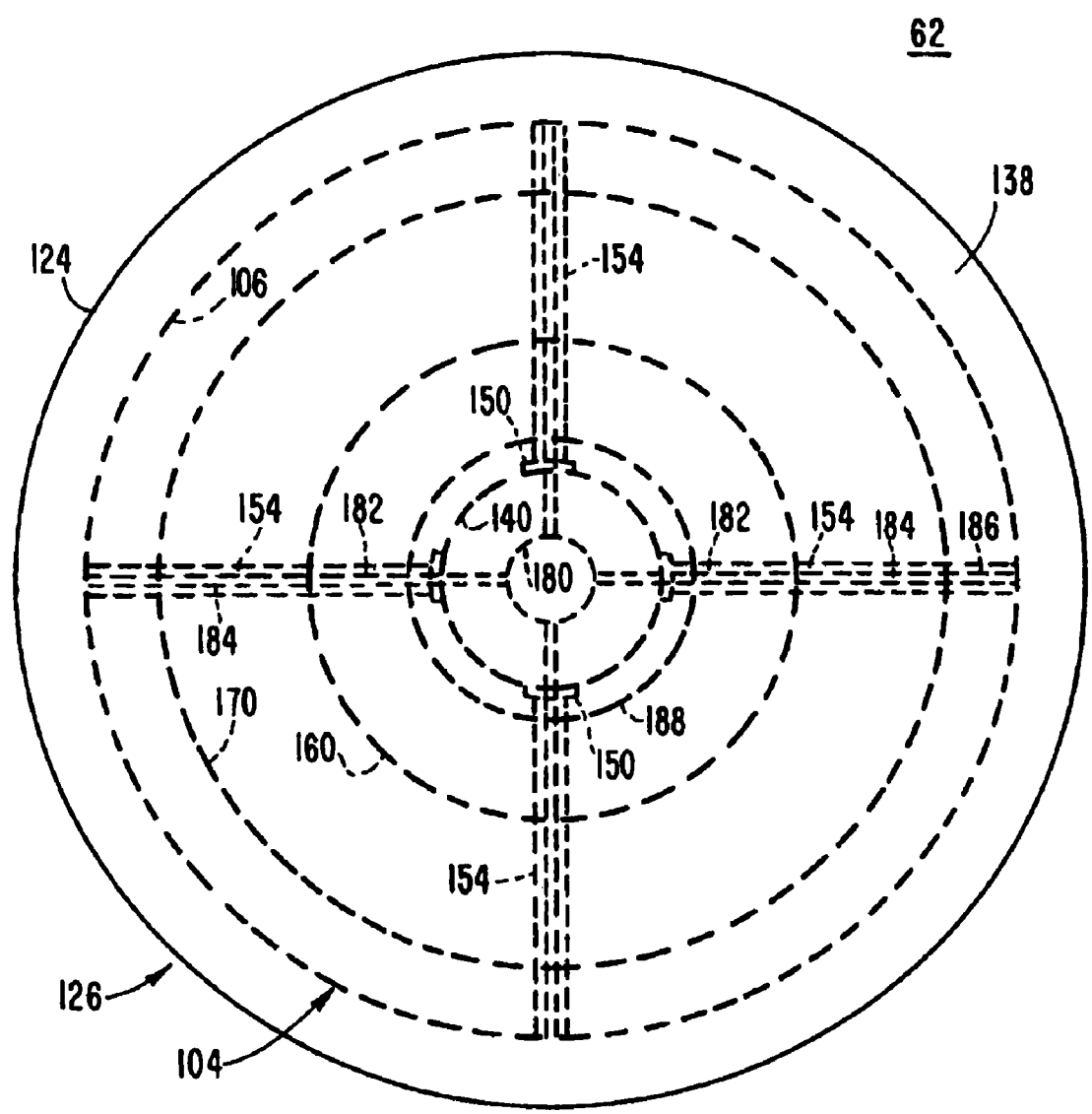
FIG. 7 is a top plan view of a column flotation cell according to an embodiment of the present invention.

As shown in FIG. 7, four equally radially-spaced braces 182 extend between a pipe support 180 (for receiving the feed tube 66) and the first baffle 160, four equally radially-spaced braces 184 extend between the first baffle 160 and the second baffle 170, and four equally radially-spaced braces 186 extend between the second baffle 170 and the top 106 of the sidewall 104 of the column 100.

With particular reference to FIG. 7 there is seen, from the inside to the outside, the following components: the pipe support 180, the feed well 140, the feed well baffle 188, the first baffle 160, the second baffle 170, the top 106 of the sidewall 104 of the column 100 and finally the top 124 of the sidewall 126 of the launder 120.

Baffles 160 and 170 aid in the further reduction of turbulence in column 100 and separation of impurities B from the phosphate C. C then spills out of the top 106 of the column 100 into the launder 120 for collection. It is possible to have one or more baffles depending on the dimensions of the column.

In order to maintain the column 100 level, a level control 164 is used. A level control 164 ensures that the phosphate froth C spilling into the launder 120 spills out evenly, reducing the spilling of any of the other contents of the column 100 into the launder 120. The level control 164 may be any conventional level control device and may be clamped to the top 106 of the column 100. (See FIGS. 5 and 6).

A computerized process controller or programmable logic controller, e.g. an Allen Bradley model AB Micrologic 1000 PLC control interface 200, herein referred to as "PLC", is used for a density control process 210, described below. (See FIGS. 6 and 9). The PLC 200 is coupled to a bubble tube 130, the pinch valve 94 and the regulating device 118.

FIG. 8 is a side cross-sectional view of the feed well 140. Two down pipes 90 are introduced directly into the feed well 140. See also FIGS. 2 and 6. The down pipes 90 extending into the feed well may be of smaller diameter compared to the down pipes 90 introduced directly into the column 100.

The shape of the feed well 140 is shown to be generally columnar. (See FIGS. 2, 6, and 8). However, in alternate embodiments, the feed well 140 may be cubical, or conical as in U.S. Pat. No. 4,735,709, or of another shape. The shape of the feed well 140 does not have a significant impact on the separation process so long as the down pipes 90 entering the feed well allow for sufficient aeration of the incoming slurry.

In regard to operation of the separation system 60, reference is made particularly to FIGS. 2, 6, and 8. Slurry A is fed from the slurry source 68 into the feed well 140. The incoming slurry A contains premixed collector such as tall oil, as discussed above.

The down pipes 90 introduce aerated water into the feed well 140 aerating the feed slurry A. The column 100 is filled with aerated water via the down pipes 90. Feed slurry A filling the feed well 140 and begins frothing as the air bubbles released from the aerated water move from the bottom 142 of the feed well 140 in an upward flow to the top 146 of the feed well 140. The aeration of A produces phosphate froth C. This upward flow of the air bubbles provides the air holdup. The air holdup carries the attached hydrophobic phosphate particles C to the top 146 of the feed well 140 and to the top 106 of the column 100.

The impurities B including sand spill out from the feed well 140 over the feed well baffle 188 and baffles 160 and 170. As discussed above, the feed well baffle 188 functions to substantially reduce the turbulence from the impurities and un-separated phosphate flowing outward from the feed well 140 to yield substantially impurity-free phosphate froth C. Substantially most of the separation of the phosphate from the impurities such as sand and clay occurs in the feed well 140.

The remainder of the separation is completed inside the column 100, which also receives down pipes 90 that introduce aerated water at the bottom 102 of the column 100. C spills out of the top 106 of the column 100 due to the air holdup mentioned above to be received by the trough 138 formed between the column and the launder 120, where C moves by gravity to the bottom 122 of the launder 120, to be removed, when desired, via the outlet 128 of the launder 120 of the primary cell 62. It is possible to use additional baffles towards the top of the column to further aid in removing any remaining impurities from C. The impurities separated from the phosphate froth C collect at the bottom 102 of the column 100 to form a sand bed "W" containing clay and other separated impurities as well. (See FIG. 6). The bottom of sand bed W is a plug or choked condition which can be controlled by varying the number and the spacing of the down pipes 90 in the column 100. The number of down pipes 90 that may be placed within the column 100 is directly related to the average particle size of the settling impurities forming the sand bed W at the bottom 102 of the column 100.

The down pipes 90 provide the air holdup mentioned above along with even dispersion of air throughout the column 100 and the feed well 140. The down pipes 90 can accomplish these important functions without choking. This is possible because aerated water is thrust down the down pipes 90. The aerated water discharges at the bottom 102 of the column 100 inside the sand bed W or at the bottom 142 of the feed well 140.

The aerated water releases the air bubbles within the sand bed W. The sand bed W breaks up the air bubbles into a multitude of small air bubbles that rise through the sand bed substantially uniformly. The sand bed W also slows down the turbulence caused by the aerated water being released via the down pipes 90 at the bottom 102 of the column 100. As the aerated water is introduced into the bottom 102 of the column 100 via the down pipes 90, the air bubbles naturally pass through the sand bed by taking the path of least resistance. No constriction plate is used or required, unlike the prior art discussed above. Since, there is no such plate with orifices used in the present invention, there is no choking.

It is possible for the down pipes 90 to choke, however, this problem can be avoided by maintaining a high pressure of aerated water being thrust into the down pipes 90 by adjusting the position of the eductors 92 with respect to the bottom 102 of the column 100 (See FIG. 6). Aerated water exiting at high pressure from the bottom of the down pipes 90 will prevent any possibilities of choking of the down pipes 90 because of the pressure differential created at the bottom of the down pipes 90 where the aerated water is released. Therefore, the incoming aerated water via the down pipes 90 has to have sufficient air pressure in order to overcome the weight of the sand bed W.

Figure 1:
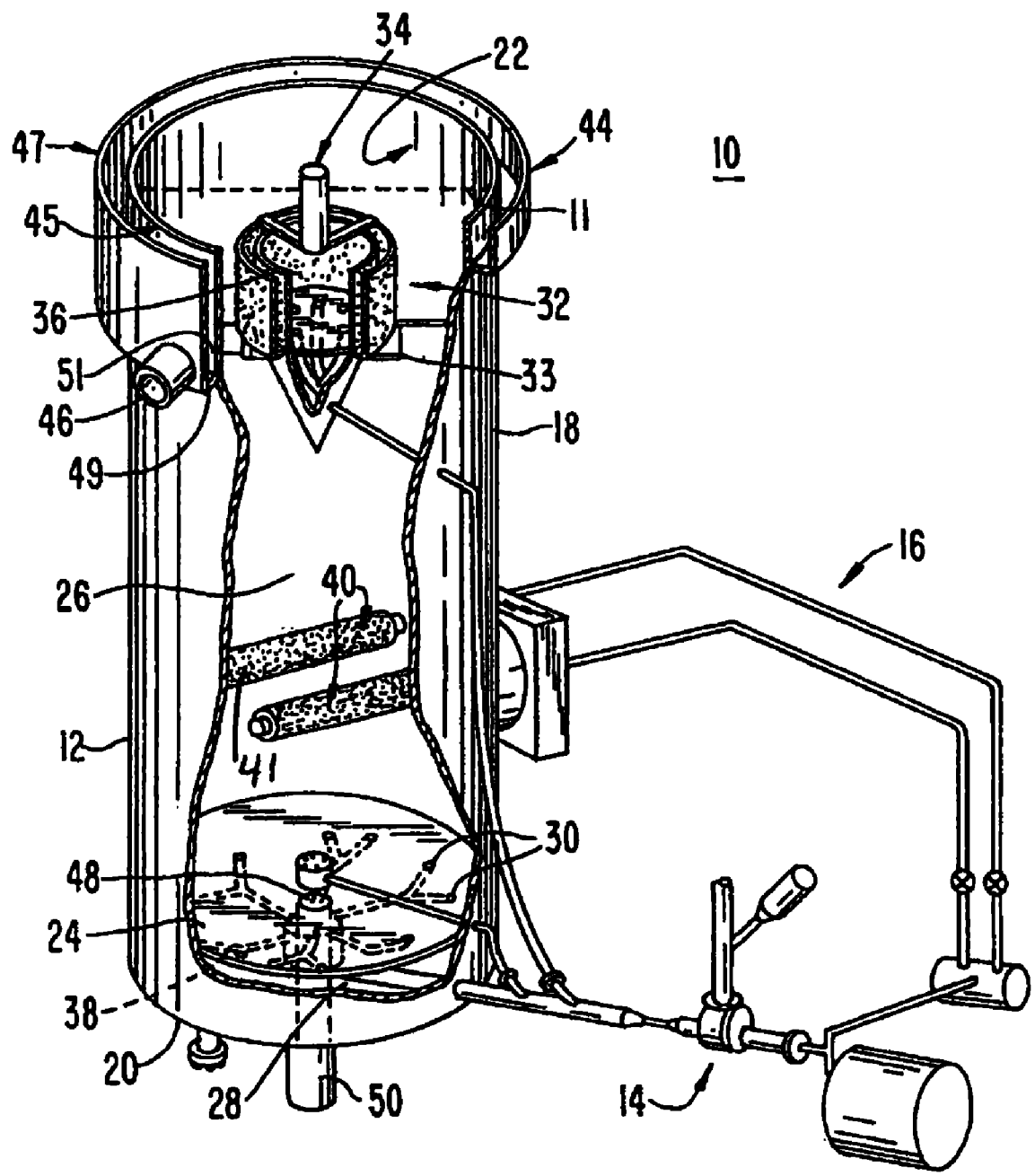
FIG. 1 is a perspective, partial cross-sectional view of a prior art column floatation cell.

The air bubbles being released at the bottom of a column of water, as in the prior art (FIG. 1), achieve maximum rise velocity within 2-3 feet. As the air bubbles move towards the top of a water column formed inside the column 100, they get larger and larger because the pressure inside the column decreases towards the top 106 of the column 100. This expansion and rise velocity creates some turbulence or a slight back eddy, which is a low-pressure zone behind these rising air bubbles. The impurities B, including fine particles of sand within the column, actually 'tail gate' this low-pressure zone behind the air bubbles. The result, therefore, is that it is possible to obtain a cleaner phosphate froth C at the top of the column 106 by hindering the rise of the air bubbles.

As the separation process moves forward, it is possible to have five virtual zones, shown in FIG. 6, within the column 100, based on the type of materials found in each zone separated by physical and chemical properties.

Zone "R" is found towards the bottom of the column and is the zone containing settling impurities B such as sand and clay forming the sand bed W. Zone "R" is the zone where aerated water from the down pipes 90 enters the bottom 102 of the column 100. Since, the sand bed acts as a dispersion plate by breaking up the air bubbles being released from the aerated water into smaller air bubbles, and also evenly dispersing the air bubbles throughout the column 100, it is important to have a substantial quantity of sand in Zone "R" to ensure the even dispersion of the air bubbles throughout the column 100.

The next zone is Zone "S", which is located above Zone "R". Zone "S" is a substantially homogeneous slurry zone. Zone "S" contains a higher percentage of un-separated phosphate particles. There is sufficient stability to allow for density measurements within Zone "S", as discussed below.

The next zone is Zone "T", which is located above Zone "S". Zone "T" is the contact zone, where the rising air bubbles within the column 100 interact with B spilled over from the top 146 of the feed well 140. Zone "T" is generally located above the top 146 of the feed well 140. Zone "T" generally is a higher density zone compared to zones "U" and "V", discussed below. Zone "T" contains lighter components of impurities B such as clay particles, sticks, etc. that were separated from the incoming feed slurry A. The bottom of Zone "T" is where the air bubbles exit the sand bed W. The air bubbles rise rapidly in this zone but are hindered in their upward movement through the column because of the settling sand from the top 106 of the column 100. This hindrance is more prominent towards the bottom Zone "T" where the air bubbles are first being released. The middle through the top of Zone "T" is therefore fairly turbulent. However, this provides a good environment to increase the contact probability of any un-separated hydrophobic phosphate particles to an air bubble to rise upward to become part of the phosphate froth C.

Zone "U" is located above Zone "T" and is the next zone moving towards the top 106 of the column 100. Zone "U" primarily contains clear water, rising air bubbles, and some phosphate froth rising upwards by the help of the air holdup discussed above.

Finally, there is Zone "V", which is located above Zone "U" and is found on the very top 106 of the column 100. Zone "V" primarily contains phosphate froth C substantially free from impurities, spilling out the top 106 of the column 100 into the launder 120.

As the slurry A continues pouring into the feed well 140 via feed tube 66, the environment within the cell 62 keeps changing depending on the quantity and quality of the feed slurry A being introduced. Over a period of time, the cell 62 may tend to have one or a combination of the following problems due to the fluctuations in the feed slurry A: too much sand is deposited in the sand bed, too much or too little slurry feed A enters the cell 62, the particle size of the impurities including sand is too small increasing the total surface area of the impurities within the column 100 requiring more water for effective separation, etc. If one or a combination of these problems occur, the separation process will have to be suspended until the contents within the cell can reach equilibrium to continue with effective separation of the phosphate froth from the impurities.

Figure 9:
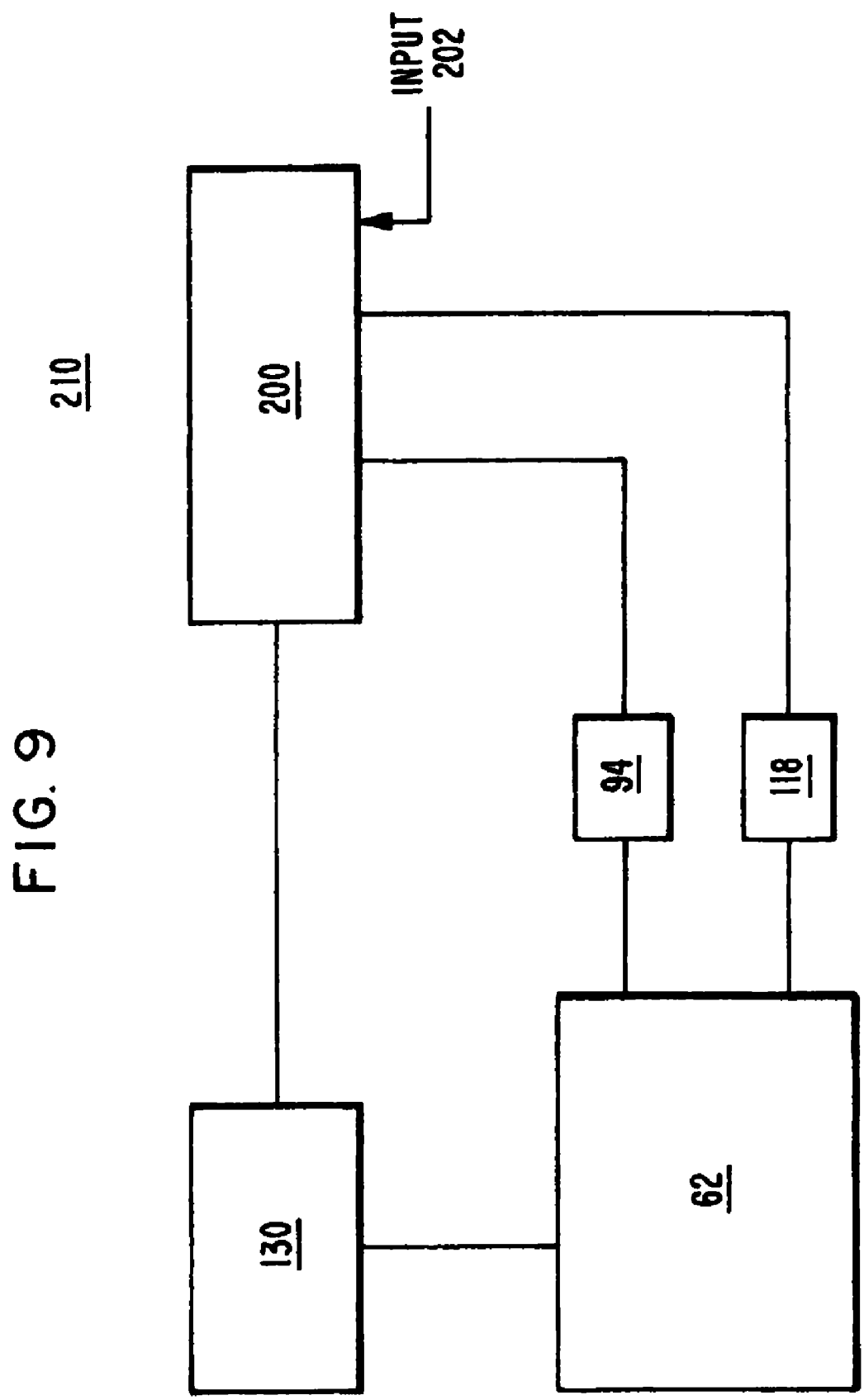
FIG. 9 is a schematic view of the cell density control process according to an embodiment of the present invention.

In order to avoid down time and to avoid the suspension of the separation process, the density control process 210 can be used, as shown in FIG. 9. The PLC 200 is coupled to the pinch valve 94 and regulating device 118. The PLC 200 is also coupled to the bubble tube 130 to measure the density of the contents within the column 100. Any suitable density measuring device may be used instead of the bubble tube 130.

In a preferred embodiment, as shown in FIG. 9, the density control process 210 entails measuring the density of the contents within the column towards the top of Zone "S" for the reasons described above by using the bubble tube 130. One or multiple density measurements may be taken so long as the density is measured in a zone or zones where stable measurements can be taken, e.g., the bottom or middle of Zone "S".

The PLC 200 reads the density measurement by the bubble tube 130 and compares it to a stored manually adjustable set point 202 inputted into the PLC. Then based on the comparison between the density measurement and the set point 202, the PLC 200 controls the opening or closing of the pinch valve 94 and the regulating device 118. The pinch valve 94 controls the flow of the impurities exiting the cell 62 via outlet 108. The regulating device 118 controls the flow of the incoming slurry via feed tube 66 within the cell 62. The density control process 210 repeats continuously maintaining the density within the cell 62 at the set point 202.

For example, when the slurry feed A comes into the cell 62, the density of the cell 62 automatically starts to increase. If the PLC 200 detects that the measured density is greater than the set point 202, the PLC 200 controls the opening of the pinch valve 94 allowing the discharge of the impurities including the sand from the bottom 102 of the column 100. The PLC 200 also controls the regulating device 118 to suspend the entry of the incoming slurry feed A. The PLC 200 thus controls the opening and closing of the pinch valve 94 and the regulating device 118 to lower the density within the cell 62 to the set point 202.

Similarly, if the PLC 200 detects that the density inside the cell 62 has fallen below the set point 202, the PLC 200 controls the regulating device 118 to allow entry of the incoming slurry feed A. The PLC 200 will also control the closing of the pinch valve 94 to suspend the discharge of the impurities from the bottom 102 of the column 100, allowing the density of the cell 62 to increase to the set point 202. The set point may be adjusted depending on temperature, pressure, type of slurry feed being introduced, etc., by manually adjusting the set point 202 in the PLC 200. The density control process 210 therefore takes into account the overall environment of the cell 62.

The cell 62 is no longer dependent on the manual control of the incoming feed via feed tube 66 based on visual monitoring of the changes within the cell 62. In fact, the density control process 210 by the PLC 200 reacts to changes within the cell 62 and keeps the recovery rate of phosphate substantially stable. In a preferred embodiment of the present invention, the set point 202 can be preset in the PLC 200 in the range of about 1-1.5 specific gravity of the contents within the cell 62 as compared to the specific gravity of water.

Although it is preferred to measure density towards the top of the Zone "S" as discussed above, it is possible to measure density at various locations within the column 100 so long as stable measurements can be made. For example, another measurement of density could be taken towards to top of Zone "U" for obtaining a differential density measurement.

The advantages of the density control process include but are not limited to maintaining equilibrium within the cell 62, allowing a continuous separation process, eliminating the need for regular maintenance of the cell 62, and, most importantly, increasing phosphate recovery and efficiency by minimizing fluctuations within the cell 62 caused by the type of incoming slurry feed A, temperature, pressure etc.

As an alternative, the same process control can be achieved by measuring a pressure differential in any two stable zone. Based on the comparison between pressure differential and the set point pressure differential, the pinch valve 94 and regulating device 118 can be controlled in the same manner, and achieve the same advantages, as described above.

As can be seen from above, the present invention provides an apparatus and a process for recovering phosphate using a column flotation cell that substantially reduces the requirement for regular maintenance of the cell 62 because of the use of down pipes that do not choke and the density control process described above.

The invention also prevents substantial choking of constriction plates because no such plates are required for the dispersion of air throughout the column. The down pipes 90 do not choke due to sufficiently pressurized aerated water that thrusts out of the bottom of the down pipes 90. Further, the sand bed in Zone "R" eliminates the need for a constriction plate to disperse air.

This invention also allows agitation of feed and water in the bottom of the column which promotes better dispersion of air into the cell than the prior art apparatus because the sand bed in Zone "R" naturally breaks down air bubbles into a multitude of smaller air bubbles, while at the same time dispersing the air bubbles evenly as they rise towards the top of the column.

Because the invention utilizes cell density control or pressure differential control there is improved recovery of the phosphate.

Further, this columnar floatation cell is characterized by a substantially compact design, relative to the prior art, which reduces capital cost for installation and reduces maintenance costs: smaller columns are easier and cheaper to install and are easier to operate and maintain.

Although the above description provides an example of recovering phosphate from impurities, other minerals may be separated from impurities using the same apparatus and method as described above.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. An apparatus for separating a mineral from a slurry including the mineral and impurities, comprising: a vessel for containing fluid and having a first, open end and a second end; a feed well disposed near the first end of the vessel, wherein the feed well has a first, open end and a second end, and wherein the first end of the feed well receives the slurry; at least one first member received through the first end of the feed well for providing aerated water to the second end of the feed well, releasing air bubbles that move from the second end of the feed well toward the first end of the feed well, creating a froth in the feed well including substantially the mineral, wherein the mineral froth substantially separates from the impurities and floats out of the first end of the feed well and towards the first end of the vessel; and a collection unit having a first open end and a second end, and being located at the first end of the vessel, wherein the mineral froth moves into the first end of the collection unit from the first end of the vessel, and wherein the impurities and any remaining mineral fall by gravity towards the second end of the vessel.

2. The apparatus of claim 1, further comprising at least one measurement unit placed within the vessel for measuring at least one of density and pressure of the fluid in the vessel.

3. The apparatus of claim 1, further comprising at least one second member received through the first end of the vessel and providing aerated water to the second end of the vessel, releasing air bubbles that move from the second end of the vessel toward the first end of the vessel, further creating the mineral froth.

4. The apparatus of claim 1, wherein the vessel is first and second vessels, each having a first, open end, a second end and a collection unit, wherein a fluid conduit connects the second end of the first vessel with the first end of the second vessel to transfer fluid from the first vessel to the second vessel, and the second vessel includes an outlet at the second end for removing impurities, and each collection unit includes an outlet for recovering the mineral froth.

5. The apparatus of claim 1, wherein the feed well is adjustably mounted relative to the vessel.

6. The apparatus of claim 1, wherein the slurry comprises a collector and a frother.

7. The apparatus of claim 6, wherein the frother is hydrocarbon.

8. The apparatus of claim 1, wherein the at least one first member is a pipe disposed a distance of about 2-3 diameters of the pipe from the second end of the feed well.

9. The apparatus of claim 3, wherein the at least one second member is a pipe disposed a distance of about 2-3 diameters of the pipe from the second end of the vessel.

10. The apparatus of claim 1, wherein the at least one first member is two spaced pipes.

11. The apparatus of claim 3, wherein the at least one second member is five equally-radially spaced pipes.

12. The apparatus of claim 1, wherein at least one baffle is positioned at the first end of the vessel to further separate the mineral froth from the impurities.

13. The apparatus of claim 1, wherein at least one baffle is positioned at the first end of the feed well to further separate the mineral froth from the impurities.

14. The apparatus of claim 1, wherein the at least one first member provides the aerated water at high pressure.

15. The apparatus of claim 3, wherein the at least one second member provides the aerated water at high pressure.

16. The apparatus of claim 2, wherein a plurality of zones is formed within the vessel based on differences in at least one of density and pressure of the fluid, including a relatively most dense/highest pressure zone at the second end of the vessel and a relatively least dense/lower pressure zone at the first end of the vessel, and wherein the measurement unit provides a measurement of said at least one of density and pressure in the fluid between the first and second ends of the vessel.

17. The apparatus of claim 16, wherein when the measurement is greater than a predetermined amount, less slurry is added to the feed well.

18. The apparatus of claim 16, wherein when the measurement is less than a predetermined amount, more slurry is added to the feed well.

19. The apparatus of claim 17, wherein the predetermined amount is in the range of about 1-1.5 specific gravity.

20. The apparatus of claim 1, wherein the vessel has a width of about 10 feet.

21. The apparatus of claim 1, wherein the vessel has a height of about 6 feet.

22. The apparatus of claim 1, wherein the vessel has a height and a width, and a ratio of the height to the width is in the range of about 0.5-2.

23. The apparatus of claim 22, wherein the ratio in the range of about 0.6-1.33.

24. The apparatus of claim 2, wherein the at least one measurement unit is a bubble tube.

25. The apparatus of claim 1, wherein the at least one first member is fixedly connected relative to the feed well.

26. The apparatus of claim 3, wherein the at least one second member is fixedly connected relative to the vessel.

* * * * *